June 16, 1931.      T. MIDGLEY      1,809,860
TIRE TESTING MACHINE
Filed March 11, 1925      4 Sheets-Sheet 1

INVENTOR.
Thomas Midgley
BY
Edward C. Taylor
ATTORNEY.

June 16, 1931.                    T. MIDGLEY                    1,809,860
                              TIRE TESTING MACHINE
                         Filed March 11, 1925        4 Sheets-Sheet 4

INVENTOR.
Thomas Midgley
Edward C. Taylor
BY
ATTORNEY.

Patented June 16, 1931

1,809,860

UNITED STATES PATENT OFFICE

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS

TIRE TESTING MACHINE

Application filed March 11, 1925. Serial No. 14,607.

This invention relates to machines for testing, usually to destruction, pneumatic tires and the like. It has for its object the simulation, as nearly as may be, of actual conditions met with in use, and the testing of tires under controlled conditions under which various factors may be varied at will. These and other objects will be more clearly apparent when the description of the machine and its operation is considered.

Referring to the drawings.

Figure 2:
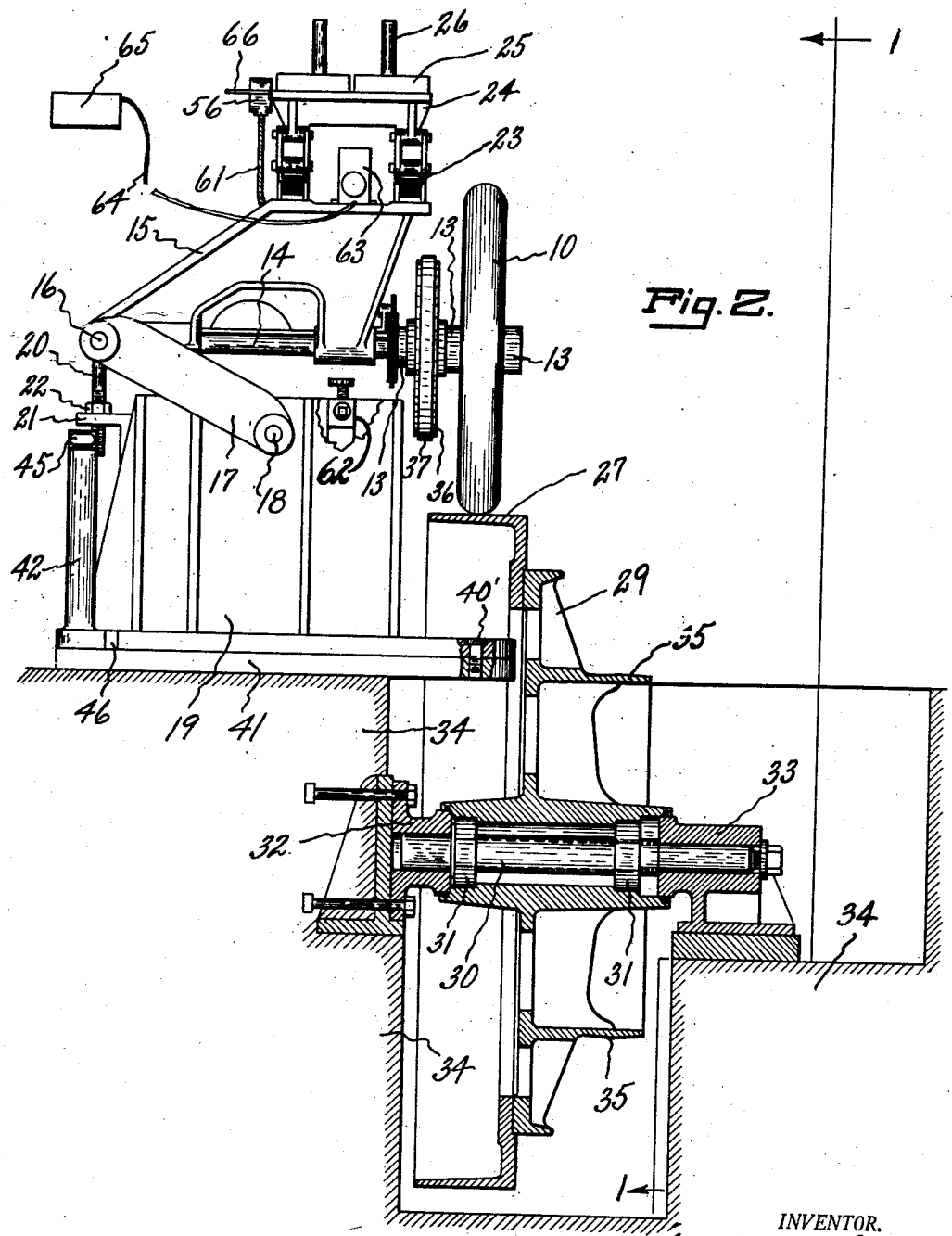
Fig. 2 is a side elevation thereof, partly in section.

The tire 10 is supported in inflated condition on the usual rim 11, which is carried on a wheel 12. This wheel is mounted on a sleeve 13, freely movable both rotatively and axially upon a shaft 14 fixed in a frame 15. Frame 15 is pivoted upon a horizontal shaft 16 which is supported by links 17 pivoted at 18 to a heavy base 19. Vertical adjustment of the links, and accordingly of the left hand side of frame 15 as viewed in Fig. 2, is accomplished by posts 20 fitting into holes on ears 21 projecting from the base 19 and prevented from sliding downwardly by nuts 22. This adjustment is used to maintain the shaft 14 horizontal when tires of different sizes are being tested.

Carried upon frame 15 by automobile springs 23 of any approved type is a platform 24 upon which may be piled weights 25, the latter being preferably perforated and stacked upon pins 26 to prevent their becoming dislodged. Any desired number of weights may be piled on this platform, subjecting the tire under test to whatever load is desired. The load is, however, a sprung load, similar to that encountered in actual use, rather than being a dead unsprung load such as hitherto has been used in tire testing machines. By a "sprung load" is meant a load carried by the tire through the intervention of a spring, in the same manner that the load of the car body and the passengers is carried by a tire in road use. By the term "dead unsprung load" is meant a weight resting directly on the tire without the intervention of a spring, in the same manner as the load of the wheel and axle is carried by the tire on an automobile.

Figure 1:
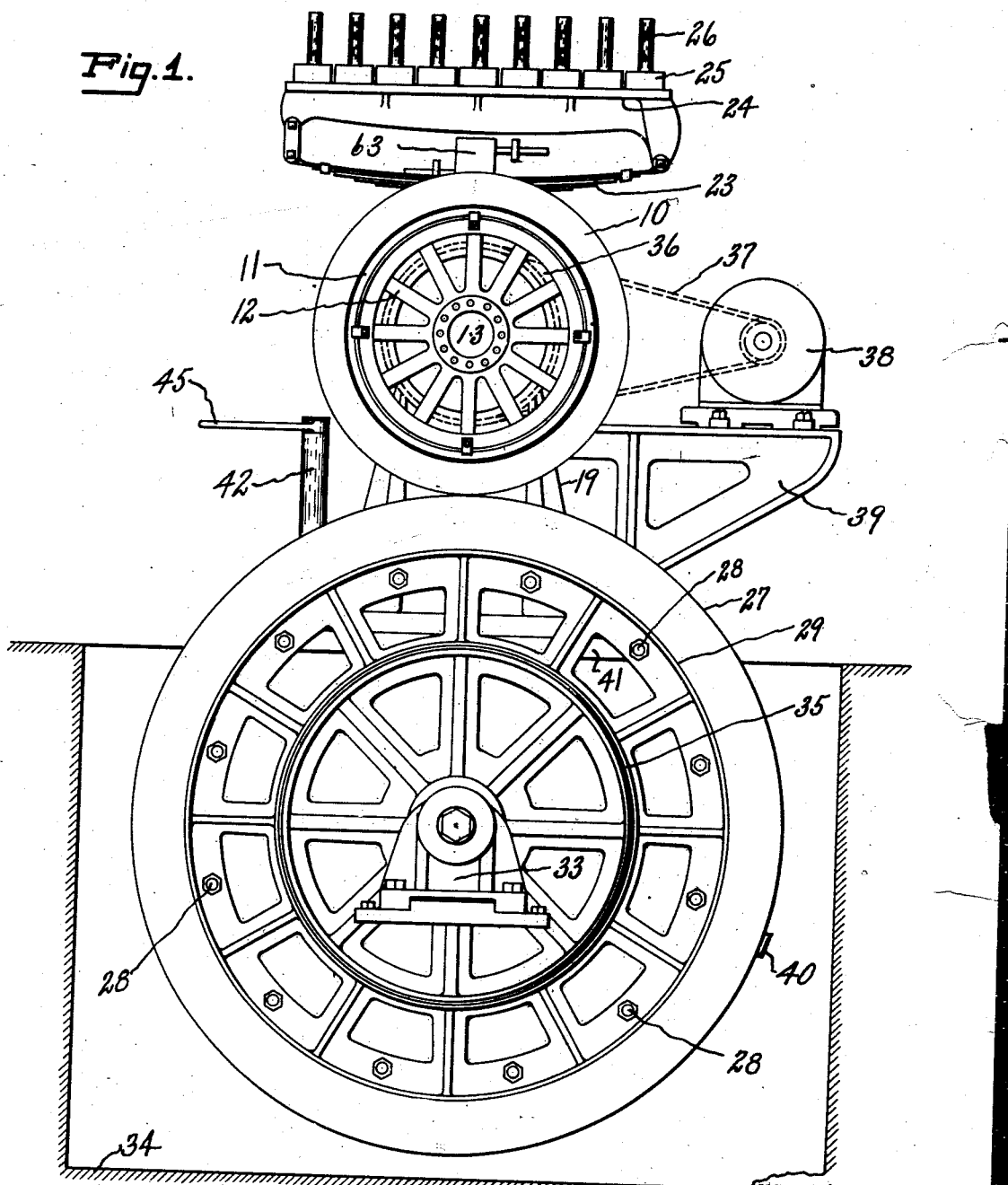
Fig. 1 is a front elevation of a testing machine constructed in accordance with the preferred form of my invention.

The tire rests upon a drum 27 secured by bolts 28 (Fig. 1) to a wheel 29 freely journaled upon a supporting shaft 30, preferably by ball bearings 31. The shaft is held in suitable brackets 32 and 33 carried by the concrete foundation 34, upon which the machine is mounted. A pulley flange 35 is preferably provided upon wheel 29 for connection to a dynamometer or a source of power as may be desired. While, as thus suggested, the power may be supplied through pulley 35 and thence to the tire through drum 27, it is preferred that power be supplied in the reverse direction so that actual conditions of use may be more closely paralleled.

For this purpose sleeve 13 is provided with a sprocket 36, by which it may be coupled through a driving chain 37 with the shaft of a motor 38 mounted on a bracket 39 carried by base 19. Due to this mounting the motor drive is independent of any vertical motion which may be given to shaft 14 by the action of the tire in test, neither being affected by this motion nor exerting any restraint upon it. The surface of drum 27 may be made of any desired material, and it may be fitted with one or more bumps or obstacles 40 if desired for the purpose of the test being made.

Instead of rigidly mounting the parts above described so that the axis of the tire is at all times parallel to the axis of the drum upon which it runs, it is preferred to so construct the apparatus that the two axes may be set at different angles to each other. This has several purposes. In choosing a pattern for a tread design, one of the factors to be considered is its wearing qualities, which depend to a large extent upon the abrasion that occurs when rounding curves. The mechanical efficiency of different tire constructions also varies, due to varying degrees of internal heat developed when the strain applied is not truly tangential. In order to test these various factors I prefer to provide the apparatus with an adjustment by which the plane of the tire may be kept in any desired angular relation to the plane of the drum 27.

Figure 3:
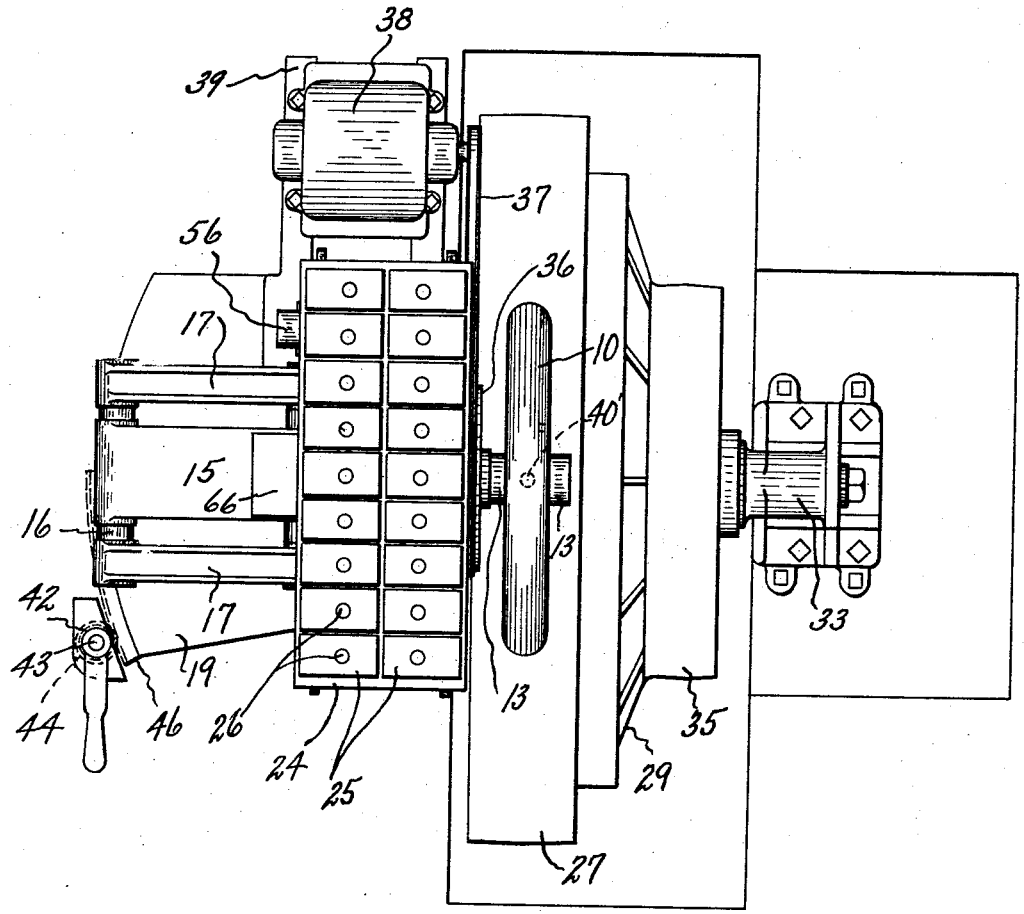
Fig. 3 is a top plan thereof.
Figure 6:
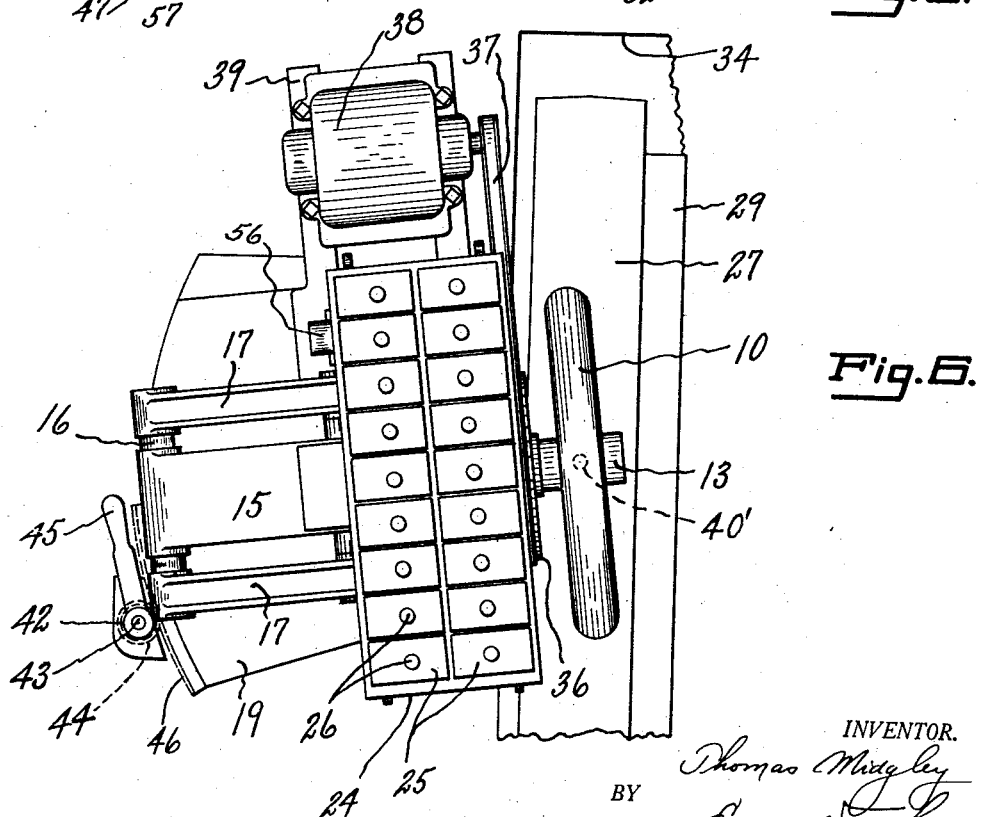
Fig. 6 is a partial view similar to Fig. 3, but showing a different setting of the apparatus.

For this purpose the base 19 is rotatably mounted by a pin 40' upon a bearing 41 rigidly held by the foundation 34. The pin is located directly under the center of the tire so that the angular adjustment of the frame takes place about the vertical axis of the tire as a center. A post 42, carried by the bearing 41, supports a shaft 43 having at its lower end a pinion 44 and at its upper end a handle 45. Meshing with pinion 44 is a gear segment 46 on the base 19. By turning the handle the base 19, and all the parts carried thereby, can be rotated as indicated by a comparison of Figs. 3 and 6, any desired setting being preserved by the weight and inertia of the parts during operation.

Figure 4:
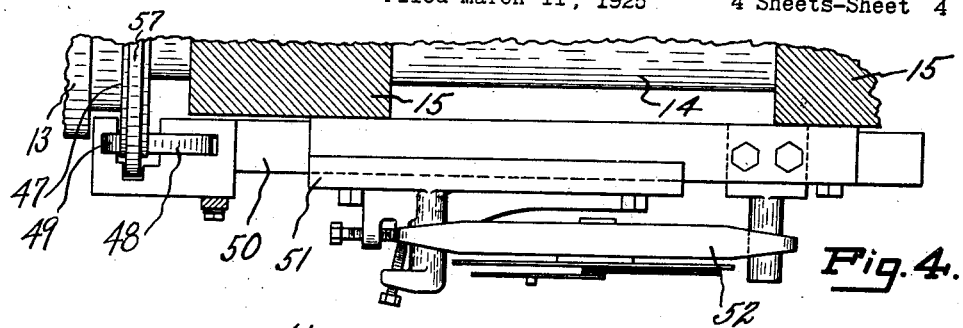
Fig. 4 is a detail of an indicating mechanism.

In cases where the plane of the tire is thus angularly positioned, it is desirable to measure the side thrust exerted by the tire on its mounting, as this is a measure of the ability of the tire to hold the road under normal driving conditions. It is for this reason that sleeve 13, which carries the tire through wheel 12, is mounted so as to be free for sliding as well as for rotation upon shaft 14. Attached to the sleeve is a disk 47 (Fig. 4), the sides of which are made smooth. Against one side of the disk a roller 48 bears, while a smaller retaining roller 49 bears against the other side. Both of these rollers are carried by a slide 50 suitably journaled in ways 51 secured on the frame 15. Between the slide and the ways is mounted a measuring device which will indicate or record the end thrust caused by the tire. In the drawings this device has been shown as a dynamometer of a standard type comprising arched springs 52 which draw together as tension is exerted on them and cause motion of a pointer 53 across a dial 54. A maximum pointer 55 may be used to register the highest thrust exerted during a run if desired.

Figure 5:
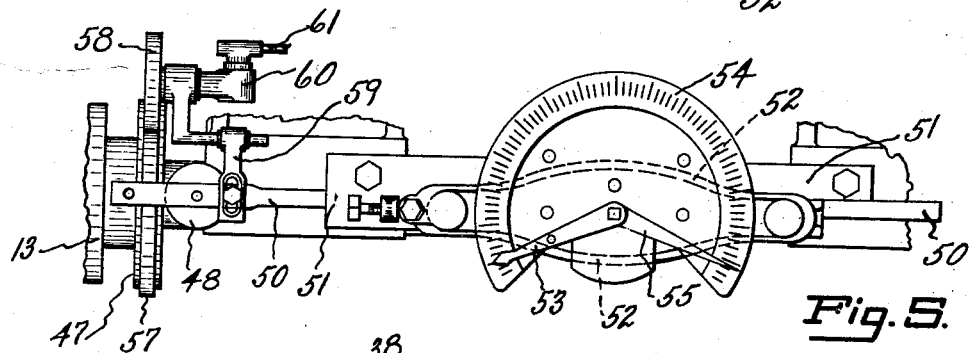
Fig. 5 is a side elevation of the mechanism shown in Fig. 4.

Disk 47 may also be utilized for the driving of a speedometer 56 (Fig. 2), used as a means of gauging the rapidity of rotation of the tire. Standard parts have been used in the case shown, and they need not be described in detail. A gear 57 (Fig. 5) is mounted on disk 47 and meshes with a pinion 58 carried by a bracket 59 secured to slide 50 so that it moves with the disk. Motion is transmitted from here to the speedometer by the usual coupling 60 and flexible shaft 61.

Another test which is useful in comparing tires of different designs is the amount and duration of oscillation given to the tire by passing over a bump. Both ease of riding and the destruction of the tire by internal friction are dependent upon this factor. The tire testing machine which is the present subject of invention is, as far as I know, the only one on which tests of this character may be satisfactorily made in the laboratory. Due to the pivotal mounting of frame 15 on shaft 16, the tire is free to move in the same way as does a tire on a car. It can even jump clear of the drum after striking an obstacle 40. Positioned at 63 on the frame is a device, of standard construction, which by its inertia gives an indication of any vertical motion made by frame 15. Such a device is described in the Journal of the Society of Automotive Engineers for July, 1925, Vol. XVII, No. 1, page 107, in an article entitled "Riding qualitities of motor vehicles", by R. W. Brown; in an article in the same journal for December, 1924, Vol. XV, No. 6, page 556, entitled "Riding qualities research", by J. A. C. Warner; in an article in the same journal for March, 1926, Vol. XVIII, No. 3, page 248, entitled "Riding qualities"; and in an article in the same journal for December, 1925, entitled "New accelerometer and vibrating apparatus described." This device is connected by a flexible sheathed wire 64 to an instrument 65 adapted to record the resultant vibrations on a time-controlled chart. By this means an accurate and permanent record may be obtained of the behavior of the tire in meeting and passing over a bump. The position shown for the instrument 63 is adapted to give the effect of the tire vibrations on the axle or other unsprung part of an automobile. If desired, the instrument may be set on a shelf 66 located above springs 23, in which case the indication given will be affected by the shock absorbing action of the spring suspension.

The operation of this testing machine should be apparent from the description above. A tire to be tested is mounted on wheel 12 and rotated at the desired speed by motor 38 until destruction. A jack 62 is preferably employed to assist in holding the frame elevated during the replacement of a tire.

Having thus described my invention, I claim:

1. A tire testing device comprising a drum against which a tire may be run, a support and a rotating means for a tire and means to move said support and said rotating means so that the plane of rotation of the tire is at an angle to the plane of rotation of the drum.

2. A tire testing machine comprising a drum against which a tire may run, means for supporting a tire for rotation against the drum with the plane of rotation of the tire at an angle to the plane of rotation of the drum, and means for measuring the end thrust produced on rotation of the tire.

3. A tire testing machine comprising a drum against which a tire may run, a base, a support pivoted about a horizontal axis carried by said base, and means on said support for rotatably mounting a tire in engagement with said drum.

4. A tire testing machine comprising a drum against which a tire may run, a base, a support pivoted about a horizontal axis carried by said base, means on said support for rotatably mounting a tire in engagement with said drum, and a spring supported platform on said support.

5. A tire testing machine comprising a drum against which a tire may run, a base, a support pivoted about a horizontal axis carried by said base, means on said support for rotatably mounting a tire in engagement with said drum, and means for adjusting the spacing of said axis from the drum.

6. A tire testing machine comprising a drum with a horizontal axis, a base rotatably adjustable about a vertical axis, a support supported on the base and rotatably adjustable around a horizontal axis, means on the support for rotatably mounting a tire in engagement with said drum, and a weight carrying platform spring supported on said support.

7. A tire testing machine comprising a drum presenting substantially a horizontal surface against which a tire may run, a tire supporting and rotating device mounted for vertical movement and adapted to carry a tire in engagement with said drum, a bump-simulating obstacle on the drum, and means for indicating the vertical motion given by the tire to the supporting device on passing over the obstacle.

8. A tire testing machine comprising a shaft, a support therefor, a tire supporting means mounted for free rotation on said shaft and for free movement longitudinally of said shaft and means to measure the thrust tending to cause longitudinal movement of the tire supporting means along the shaft upon rotation of said tire supporting means.

THOMAS MIDGLEY.